US012506757B2

(12) United States Patent
Allouche et al.

(10) Patent No.: US 12,506,757 B2
(45) Date of Patent: Dec. 23, 2025

(54) ANOMALY DETECTION USING COLLABORATIVE FILTERING

(71) Applicant: INTERNATIONAL BUSINESS MACHINES CORPORATION, Armonk, NY (US)

(72) Inventors: Yair Allouche, Dvira (IL); Bo-Yu Kuo, Kaohsiung (TW); Aviad Cohen, Meitar (IL)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 18/160,441

(22) Filed: Jan. 27, 2023

(65) Prior Publication Data

US 2024/0259409 A1   Aug. 1, 2024

(51) Int. Cl.
*H04L 9/40* (2022.01)
(52) U.S. Cl.
CPC .............. *H04L 63/1425* (2013.01)
(58) Field of Classification Search
CPC .............................................. H04L 63/1425
See application file for complete search history.

(56) References Cited

U.S. PATENT DOCUMENTS

| 11,363,037 | B2 | 6/2022 | Karin |
| 2014/0113588 | A1* | 4/2014 | Chekina ............... G06N 20/00 455/410 |
| 2017/0017760 | A1* | 1/2017 | Freese ..................... G16H 40/63 |
| 2020/0274894 | A1* | 8/2020 | Argoeti ............... H04L 63/1433 |
| 2020/0314119 | A1* | 10/2020 | Karin ..................... G06F 21/554 |
| 2021/0152581 | A1 | 5/2021 | Hen |
| 2023/0136756 | A1* | 5/2023 | Malboubi ............. H04L 43/045 709/224 |

FOREIGN PATENT DOCUMENTS

CN   104394021 B   8/2017

OTHER PUBLICATIONS

Alarcon-Aquino et al., "Anomaly Detection in Communication Networks Using Wavelets", ResearchGate, DOI. 10.1049/ip-com:20010659 Source: IEEE Xplore, Jan. 2002, 9 Pgs, <https://www.researchgate.net/publication/3350208>.

Karasek et al., "SuperB: Superior Behavior-based Anomaly Detection Defining Authorized Users' Traffic Patterns", Carleton University. Downloaded on Nov. 5, 2020 form IEEE Xplore, 9 Pgs.

(Continued)

*Primary Examiner* — Theodore C Parsons
(74) *Attorney, Agent, or Firm* — Stosch Sabo (57) ABSTRACT

Described are techniques for network anomaly detection. The techniques include generating, from network traffic, a plurality of network interactions, where respective network interactions comprise a communication source and a communication destination. The techniques further include generating, for the respective network interactions, a recommendation score using a trained Collaborative Filtering (CF) model. The techniques further include calculating, for the respective network interactions, an outlier score based on the recommendation score. The techniques further include generating a notification identifying an anomaly in the network traffic based on at least one outlier score satisfying a threshold.

19 Claims, 5 Drawing Sheets

(56) References Cited

OTHER PUBLICATIONS

Leichtnam et al., "Sec2graph: Network Attack Detection Based on Novelty Detection on Graph Structured Data", Lecture Notes in Computer Science, LNSC, vol. 12223, Jul. 7, 2020, 50 Pgs, <https://link.springer.com/chapter/10.1007/978-3-3-52683-2_12>.
Panimalar et al., "Collaborative Pattern-Based Filtering Algorithm for Botnet Detection", World Engineering & Applied Sciences Journal 7 (3): 2016, 8 Pgs, ISSN 2079-2204.
Thottan et al., "Anomaly Detection Approaches for Communication Networks", Jan. 1, 2010, Computer Communications and Networks, 16 Pgs, <https://link.springer.com/chapter/10.1007/978-1-84882-765-3_11>.
Wan et al., "Link-Based Anomaly Detection in Communication Networks", 2008 IEEE/WIC/ACM International Conference on Web Intelligence and Intelligent Agent Technology, Dec. 6, 2022, 4 Pgs.
Zhang et al., "Dynamic Link Anomaly Analysis for Network Security Management", Springer Link, Journal of Network and Systems Management 27, Nov. 13, 2018, 11 Pgs, <https://link.springer.com/article/10.1007/s10922-018-9478-8>.
Dondo et al., "Malicious activity detection", DRDC-RDDC-2021-D078, Technologysciencetechnollogie, May 2021, 69 Pgs.
Ishibashi et al., "Analyzing Internet Traffic Structure through Big Data Technology", NTT Technical Review, vol. 11 No. Nov. 11, 2013, 5 Pgs, <https://www.researchgate.net/publication/286356500>.

\* cited by examiner

ANOMALY DETECTION USING COLLABORATIVE FILTERING

BACKGROUND

The present disclosure relates to cybersecurity, and, more specifically, to anomaly detection in network traffic.

The majority of cyberattacks traverse computer networks in some way. Therefore, analysis of network traffic can serve to detect suspicious activities and breaches which might be missed with other approaches. To this end, network monitoring solutions typically employ rule-based methods to detect suspicious network activity. Rule-based approaches have served the industry well for some time, unfortunately, with the increasing sophistication of threat actors and their ability to imitate normal network behavior, the effectiveness of these approaches is rapidly deteriorating. Traditional rule-based network monitoring solutions can no longer be trusted to protect enterprises in the dynamic and evolving cyberthreat landscape.

More specifically, traditional rule-based network monitoring can suffer from insufficient accuracy in the dynamic and evolving cyberthreat landscape. For example, malicious actors can design network attacks in ways that avoid triggering known or suspected rules in a traditional rule-based network monitoring solution. In this way, traditional rule-based network monitoring solutions can exhibit insufficient accuracy by failing to detect an actual cyberthreat (e.g., true positives). As another example, traditional rule-based network monitoring can incorrectly classify previously unseen (e.g., rare), yet non-anomalous network behavior, as a cyberthreat (e.g., false positives). These deficiencies in traditional rule-based network monitoring can result in network vulnerabilities (e.g., in the case of failing to flag a true positive incident as a network anomaly) and/or inefficiencies and information overload for security analysts (e.g., in the case of erroneously flagging a false positive incident as anomalous).

SUMMARY

Aspects of the present disclosure are directed toward a computer-implemented method including generating, from network traffic, a plurality of network interactions, where respective network interactions comprise a communication source and a communication destination. The method further includes generating, for the respective network interactions, a recommendation score using a trained Collaborative Filtering (CF) model. The method further includes calculating, for the respective network interactions, an outlier score based on the recommendation score. The method further includes generating a notification identifying an anomaly in the network traffic based on at least one outlier score satisfying a threshold.

Advantageously, the aforementioned embodiments of the present disclosure result in network anomaly detection exhibiting increased accuracy relative to traditional methods of network anomaly detection by using a CF model. More specifically, the CF model can increase true positives and reduce false positives in network anomaly detection by characterizing network interactions in user-item relationships.

Additional aspects of the present disclosure including the features of the aforementioned method include the respective network interactions further including a metric associated with the communication source and the communication destination, and where the outlier score is further based on the metric.

Advantageously, the aforementioned embodiment increases the robustness of the network anomaly detection technique by utilizing the metric in addition to the output from the CF model. In this way, metrics related to respective network interactions can be utilized to balance, augment, or otherwise improve upon the output of the CF model.

Additional aspects of the present disclosure including the features of the aforementioned method include a relatively stronger recommendation score generating a relatively less anomalous outlier score, and a relatively weaker recommendation score generating a relatively more anomalous outlier score.

Advantageously, the aforementioned embodiment relates CF model output (traditionally applied to the field of recommender systems) to anomaly detection. In this way, the aforementioned embodiment enables the CF model output to be effectively utilized in network anomaly detection applications.

Additional aspects of the present disclosure including the features of the aforementioned method further include the communication source including, for respective network interactions, at least one source Internet Protocol (IP) address, at least one source Media Access Control (MAC) address, at least one source host name, at least one source username, at least one dynamic Internet Protocol (IP) range, at least one network name, and at least one container identifier.

Advantageously, the aforementioned embodiment enables a flexible definition of the communication source, thereby enabling CF to be applied to enterprise networks which can be complex in size with sparsely populated data and an unbalanced distribution of data amongst network components.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward cybersecurity, and, more specifically, to network anomaly detection using collaborative filtering (CF). While not limited to such applications, embodiments of the present disclosure may be better understood in light of the aforementioned context.

As previously discussed, traditional rules-based network monitoring methods are deficient. Responding to this deficiency, a new field called Network Traffic Analysis (NTA) has emerged. NTA uses a combination of rule-based detection, machine learning, and advanced analytics to detect suspicious activities on enterprise networks. NTA tools continuously analyze raw traffic and flow records (e.g., NetFlow®) to build ML-based behavioral models that reflect normal network behavior and highlight anomalous traffic. To establish comprehensive network models, NTA continually monitors and analyzes network traffic as it crosses the perimeter (north/south traffic), as well as when it moves laterally throughout the network (east/west traffic). The combination of comprehensive network monitoring together with utilizing rules, machine learning, and advanced analytics allows NTA to detect security threats in real-time, including, for example zero-day attacks, insider attacks, and/or other sophisticated cyberattacks.

Aspects of the present disclosure are directed toward an improved NTA technique. More specifically, aspects of the present disclosure are directed toward a network anomaly detection technique that uses collaborative filtering (CF) to detect abnormal network behavior in an organization. CF is a technique traditionally used by recommendation systems. In such applications, CF makes predictions about a user's interests in items based on similarities between users and items.

CF techniques can be divided into two main methodologies: user-item filtering and item-item filtering. User-item filtering takes a particular user, finds other users that are similar to that particular user based on similarity of ratings, and recommends items to that particular user based on items that other, similar users liked. In contrast, item-item filtering can take an item, find users who liked that item, and recommend other items that those users (or similar users) also liked. In other words, user-item CF takes users as inputs and outputs recommended items, whereas item-item CF takes items as inputs and outputs other recommended items.

To leverage CF for detecting anomalies in network traffic, aspects of the present disclosure can extract an enterprise communication matrix by monitoring the enterprise network. Then, aspects of the present disclosure can convert the communication matrix network into user-item relationships where the users can be modeled as communication sources and the items can be modeled as the consumed communication services (or communication destinations).

As in a recommendation system, aspects of the present disclosure recognize that communication sources that are similar will tend to consume similar communication services (e.g., interact with similar communication destinations). Therefore, when a communication source consumes an unrecommended service (e.g., an atypical communication destination), it can indicate an abnormal communication and be flagged as anomalous. For example, when a communication source is accessing a database with sensitive data while other users with similar communication profiles have never accessed this database, the CF model can tag that communication as unrecommended and thereby cause the anomaly detection system to provide a relatively higher anomaly score to this communication (thereby increasing the true positive rate of the anomaly detection system). As another example, evaluated network traffic can include a new communication (e.g., one that has never happened before) between a communication source and a consumed service (e.g., communication destination). Traditionally, such a communication would appear to be anomalous, however, the CF model can highly recommend it (e.g., classify it as non-anomalous) based on other communications from other, similar sources to the same service. In the aforementioned example, the CF model can provide a relatively lower anomaly score to this communication (thereby reducing the false positive rate of the anomaly detection system). Advantageously, increasing the true positive rate reduces network vulnerabilities (by detecting actual cyberthreats) while decreasing the false positive rate increases efficiencies (by reducing the number of incidents that security analysts are required to review and disposition).

However, applying collaborative filtering on enterprise communication network is challenging for several reasons. First, representing a communication matrix of even a mid-size organization can result in a prohibitively large matrix with millions of entries. With such a large amount of data, the performance of the CF model deteriorates. For example, a delay in detecting abnormal network behavior due to too much computational overhead can significantly delay a response time of a cybersecurity team, thereby increasing the likelihood that the detected abnormal network behavior causes damage for the company.

Second, network traffic data is sparse and unbalanced. Most of the addresses in the network communication graph only connect to a small subset of the whole addresses, while some of the addresses have the most connections and dominate the whole network. For example, a Domain Name Server (DNS) in the network often has more connections than other addresses since they are responsible for translating the domain to an Internet Protocol (IP) address. Thus, the sparsity and unbalanced properties of the network data can also reduce the performance of utilizing a CF model to analyze network traffic for anomalous behavior.

Third, dynamic IP addresses increase the network communication data size. Dynamic IP addresses changes from time to time. Because Internet Protocol Version 4 (IPV4) doesn't provide enough static IP addresses, dynamic IP addresses (provided by a Dynamic Host Configuration Protocol (DHCP) server) are often used in the network. However, using dynamic IP addresses causes the mapping between asset and IP address to be more complicated, and it is also a challenge for the system to learn the behavior of each address.

Fourth, network behavior changes over time. The behavior observed a month ago might be different from the behavior of this month. For example, asset A may have communicated with server S in a previous time period, but it no longer does so because that privilege expired or was removed.

Collectively, these challenges have traditionally prevented the application of CF to anomaly detection in cybersecurity. To overcome the above challenges, aspects of the present disclosure allow a flexible definition of the communication source and destination. A source identifier (ID) can be a source IP address, a source MAC address, a source host name, a username, a dynamic IP range, a network name, a container ID, etc. Furthermore, service ID (e.g., communication destination) can be defined by a destination ID (similar to source ID as discussed above) and an application name. In this way, aspects of the present disclosure enable CF to be applied to network anomaly detection.

The present disclosure relates to techniques for detecting malicious activity such as cyberattacks in enterprise networks. The present disclosure is a behavioral-based anomaly detection technique that leverages a CF model for detecting network anomalies. To do so, network traffic is mapped into user-item relationships in which the users are the communication sources and the items are the services (e.g., a combination of destinations and/or applications). The CF model can be trained on the given network traffic to model communication preferences in the given network. In a production environment, aspects of the present disclosure can monitor ongoing connections and use the trained CF model to associate each connection with a recommendation score. Furthermore, aspects of the present disclosure can convert the recommendation score to an outlier score (e.g., where the recommendation score can be inversely related to the outlier score such that the lower the recommendation score, the higher the outlier score). In the case of a relatively higher outlier score, indicating relatively more anomalous behavior, aspects of the present disclosure can generate an alert indicating the anomalous behavior.

Figure 1:
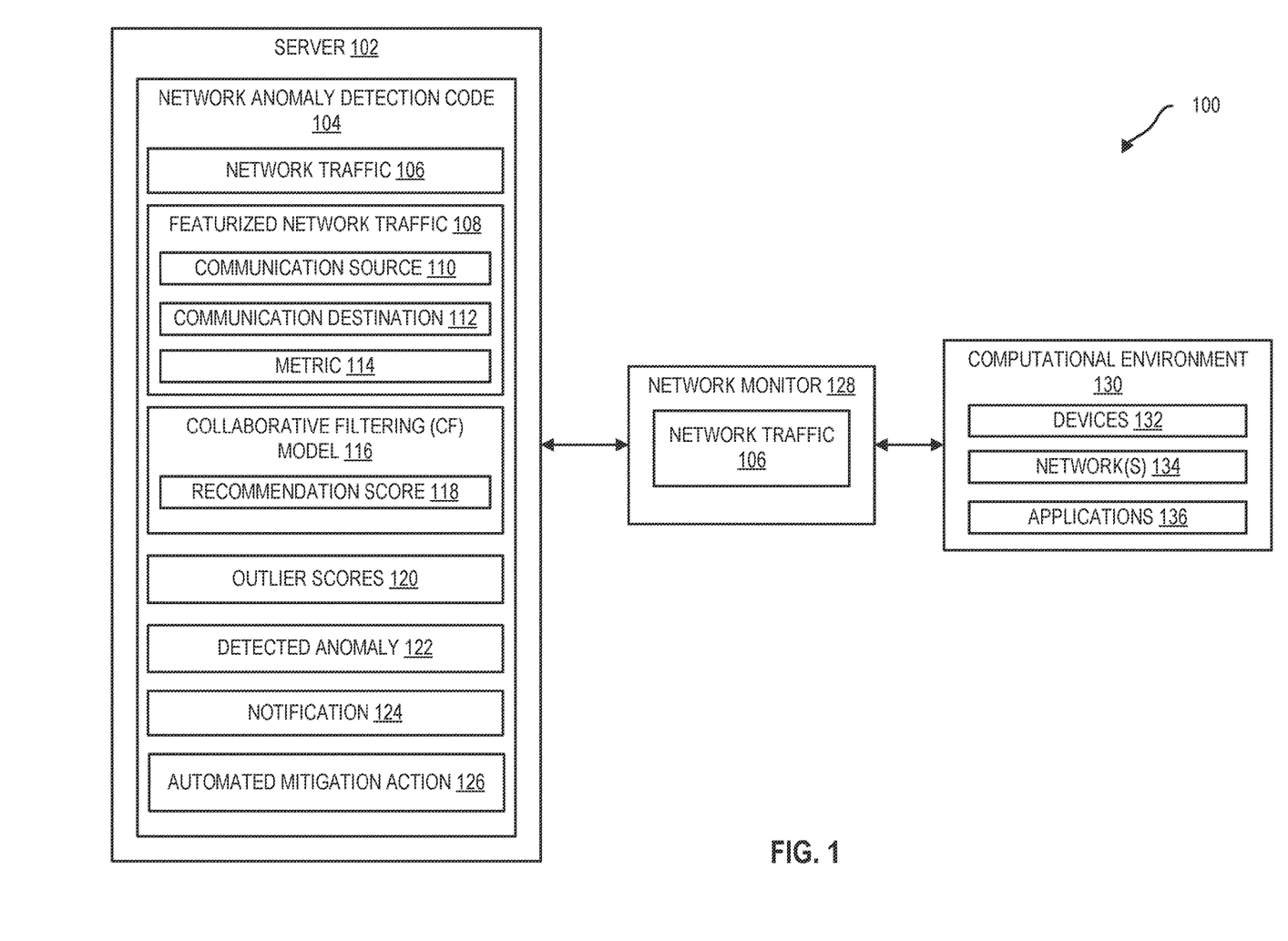
FIG. 1 illustrates a block diagram of an example computational environment implementing network anomaly detection code, in accordance with some embodiments of the present disclosure.

FIG. 1 illustrates a block diagram of an example computational environment 100 implementing network anomaly detection code 104, in accordance with some embodiments of the present disclosure. The example computational environment 100 includes a server 102 directly and/or indirectly communicatively coupled to a network monitor 128 and computational environment 130.

Server 102 can be any computational configuration of hardware and/or software capable of implementing network anomaly detection code 104. In some embodiments, server 102 can be any server, computer, mainframe, or other combination of computer hardware capable of executing software. In some embodiments, server 102 can be a virtual machine (VM), container instance, or other virtualized combination of discrete physical hardware resources.

Computational environment 130 can be any computational environment including network interactions. For example, computational environment 130 can be a public cloud environment, private cloud environment, and/or hybrid cloud environment. Computational environment 130 can include devices 132, network(s) 134, applications 136, and/or other elements of a computational environment. Devices 132 can refer to processing devices (e.g., modems, terminals, servers, processors, etc.), storage devices (e.g., disk drives, Flash drives, tape drives, etc.), and/or other devices useful for providing the hardware infrastructure to support computational environment 130.

Network(s) 134 can include networking devices (e.g., switches, routers, etc.) capable of transmitting network traffic between devices 132. In some embodiments, the network(s) 134 can be a local area network (LAN), a wide area network (WAN), an intranet, the Internet, or any other network 134 or group of networks 134 capable of continuously, semi-continuously, or intermittently connecting (directly or indirectly) multiple devices 132 together.

Applications 136 can refer to executable software code that processes data using devices 132 and/or network(s) 134 to achieve a desired result for a user.

Network monitor 128 can collect network traffic 106 from network(s) 134 of the computational environment. Network traffic 106 can be streamed directly from the network(s) 134 to the network monitor 128 or stored to the flow database (not shown) and retrieved by the network monitor 128 as a dataset of traffic flows. The network traffic 106 can be formatted according to any suitable format, including Internet Protocol Flow Information Export (IPFIX) or NetFlow®, for example.

Referring to network anomaly detection code 104, it can be configured to receive the network traffic 106 from the network monitor 128. The network anomaly detection code 104 can be configured to generate featurized network traffic 108 from the network traffic 106. The featurized network traffic 108 can include, for respective network interactions of the network traffic 106, a communication source 110, a communication destination 112, and/or a metric 114. In some embodiments, the featurized network traffic 108 generates an output in the format of <user, item, metric> for each network interaction, where the user can represent the communication sources 110 (e.g., source IP address, source MAC address, source host name, username, dynamic IP range, network name, container ID, etc.), and items can represent a combination of communication destination (e.g., destination IP address, destination MAC address, destination host name, username, dynamic IP range, network name, container ID, etc.) and application (e.g., application ID, destination port, etc.).

As previously discussed, aspects of the present disclosure allow an elastic definition for user (e.g., communication source 110) and item (e.g., communication destination 112). Specifically, aspects of the present disclosure allow the user and item to be any function of network flow attributes. In other words, the user and the item representations can be a function of flow attributes A and domain knowledge N, where $f, g$ are some transformation functions: user=$f(A, N)$ and item=$g(A,N)$. For example, the user can represent a sub-network within the network hierarchy. In this example, the function $f$ can transform the source IPs and network hierarchy into the source network name (e.g., communication source 110). As another example, the user can represent the source host name. In this case the function $f$ will transform the current source IP to the corresponding host name (e.g., communication source 110). The g function can be similar. For example, an item can represent the DNS service provided by a specific server. In this case, the function g can convert the destination IP and destination port to the server's hostname and the DNS service name (e.g., communication destination 112).

The metric 114 of a link between a user (e.g., communication source 110) to an item (e.g., communication destination 112) can be a number that represents some quality of usage of the service, for example, the amount of exchanged data, the recency or freshness of the link (when last time the link was used), how frequently the link is used, etc. In some embodiments, the metric 114 can be distributed in a fixed predefined range. For example, the metric 114 can be normalized using a maximum value of the metric 114 or some other technique.

CF model 116 can ingest the featurized network traffic 108 and generate recommendation scores 118 for respective network interactions (e.g., links) in the featurized network traffic 108. The recommendation scores 118 can reflect a degree to which the CF model 116 recommends the interaction between the communication source 110 and the communication destination 112. A relatively higher recommendation score 118 can indicate a relatively more expected (and therefore less anomalous) interaction between the given communication source 110 and communication destination 112. On the other hand, a relatively lower recommendation score 118 can indicate a relatively less expected (and therefore more anomalous) interaction between the given communication source 110 and communication destination 112.

CF model 116 can implement any CF techniques, now known or later developed. For example, CF model 116 can employ memory-based CF (e.g., where user ratings are used to compute similarities between users and/or items), model-based CF (e.g., using machine learning models to predict users' ratings of unrated items), hybrid-based CF (e.g., a combination of memory-based and model-based CF techniques), deep-learning based CF (e.g., CF utilizing non-linear neural architecture, variational autoencoders, etc.), context-aware CF (e.g., CF incorporating context information such as time, location, and/or other information to generate context-aware recommendations), and/or other CF techniques.

Network anomaly detection code 104 can be configured to generate outlier scores 120 based on the recommendation score 118 and/or the metric 114 for respective interactions between a communication source 110 and a communication destination 112 in the featurized network traffic 108. In some embodiments, the outlier scores 120 can be normalized as shown in Equation 1:

$$\text{score function} = \frac{\text{maximal rating}}{\text{rating}} \quad \text{Equation 1}$$

In Equation 1, a maximal recommendation score 118 can be divided by a respective recommendation score 118 to normalize the range of recommendation scores. In other embodiments, Equation 1 can be inverted so that a respective recommendation score 118 is divided by a maximal recommendation score 118.

In other embodiments, the outlier score 120 can be generated based on both the recommendation score 118 and the metric 114. For example, the outlier score 120 can be generated as a normalized difference between the recommendation score 118 and the metric 114 as shown in Equation 2:

$$\text{score function} = \frac{\text{abs(rating} - \text{predicted\_rating)}}{\text{maxmimal rating}} \quad \text{Equation 2}$$

As shown in Equation 2, the outlier score 120 can be determined by taking the absolute value of a difference between the recommendation score 118 and the metric 114 and dividing by a maximal rating (e.g., a maximum recommendation score 118 and/or a maximum metric 114).

Network anomaly detection code 104 can be further configured to identify a detected anomaly 122 based on the outlier scores 120. For example, a detected anomaly 122 can be identified based on an outlier score 120 satisfying a threshold (e.g., an outlier score 120 exceeding a threshold). The detected anomaly 122 can be associated with a single network interaction of the featurized network traffic 108 or a set of interactions in the featurized network traffic 108.

Network anomaly detection code 104 can be configured to generate, transmit, and/or present a notification 124 indicating the detected anomaly 122. For example, the notification 124 can be transmitted to a workstation, terminal, and/or application implementing cybersecurity software capable of manual or automated review of the detected anomaly 122. In some embodiments, network anomaly detection code 104 is further configured to implement an automated mitigation action 126 to address the detected anomaly 122. For example, the automated mitigation action 126 can include, but is not limited to, isolating one or more devices 132 of the computational environment 130, quarantining or terminating one or more applications 136, and/or adjusting Quality of Service characteristics (e.g., bandwidth, etc.) of one or more network(s) 134.

FIG. 1 is for illustrative purposes and should not be construed as limiting. More, fewer, and/or different components than the components illustrated in FIG. 1 can be present while remaining within the spirit and scope of the present disclosure. Further, illustrated components can be separated into multiple, discrete components, and/or multiple discrete components can be combined together into a single component, while remaining within the spirit and scope of the present disclosure.

Figure 2:
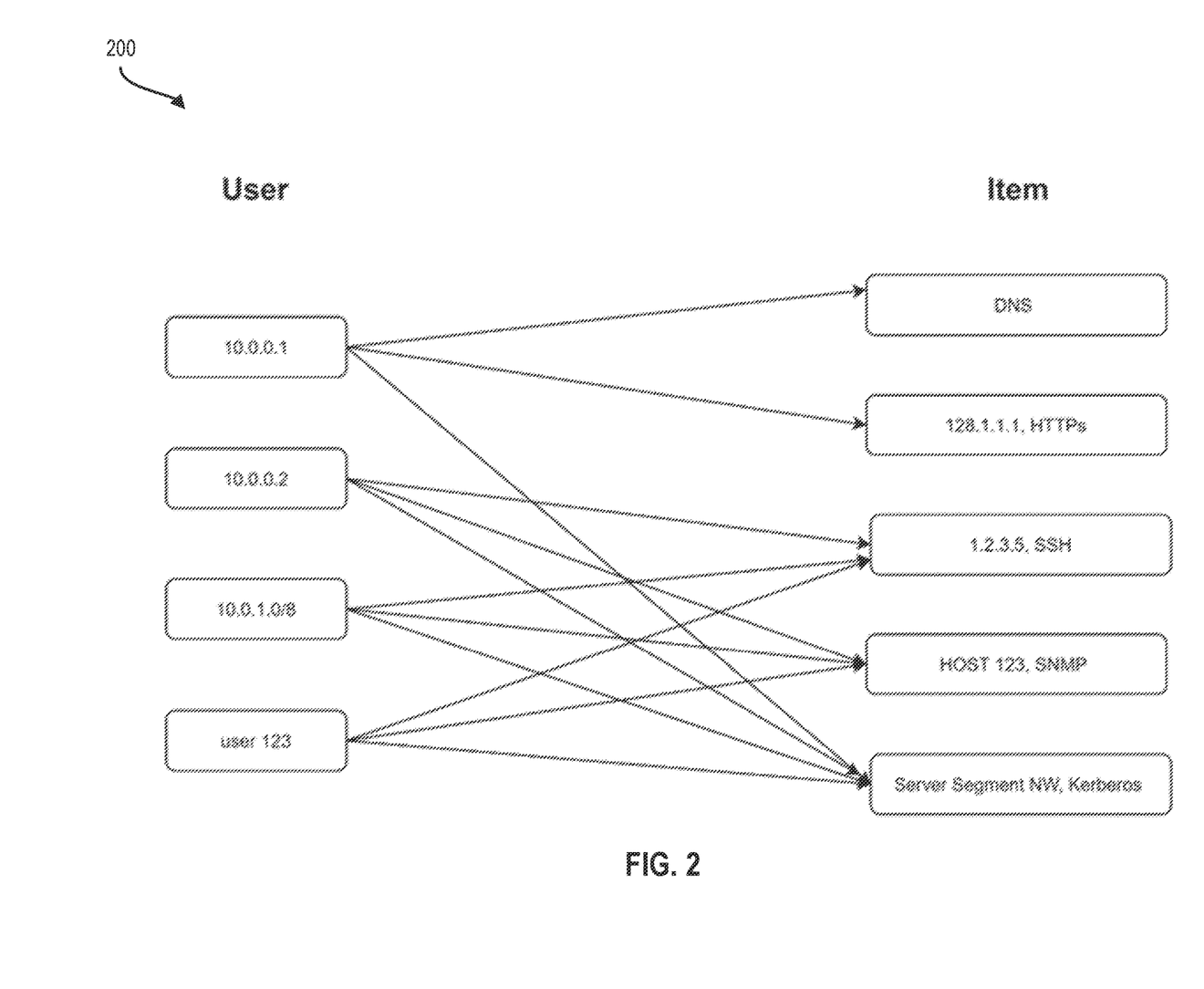
FIG. 2 illustrates an example diagram illustrating network information as user-item relationships for purposes of collaborative filtering (CF), in accordance with embodiments of the present disclosure.

FIG. 2 illustrates a diagram 200 of example user-item network interactions in network traffic, in accordance with embodiments of the present disclosure. In diagram 200, various users are shown on the left side of diagram 200 and various items are shown on the right side of diagram 200. In some embodiments, respective users can be consistent with communication sources 110 of FIG. 1 and respective items can be consistent with communication destinations 112 of FIG. 1. Accordingly, respective users can be identified by source IP address, source MAC address, source host name, username, dynamic IP range, network name, container ID, and the like. Additionally, respective items can be identified by one or more destination identifiers (e.g., destination IP address, destination MAC address, destination host name, username, dynamic IP range, network name, container ID, etc.) and/or application identifiers (application ID, destination port, etc.).

As shown in the diagram 200, users are connected to items by directed arrows representing user interactions with respective items. Furthermore, each user can have multiple interactions with the same or different items. Various metrics related to user-item interactions can be collected (e.g., metrics 114 of FIG. 1) related to interaction volume (e.g., an amount of data exchanged), interaction frequency (e.g., a number of same or similar interactions in a predefined time period), and/or interaction recency (e.g., a time elapsed since a last of a given interaction). Advantageously, aspects of the present disclosure can differentiate anomalous from non-anomalous network interactions using CF (e.g., comparing historical user-item interactions of a given user and other, similar users).

Figure 3:
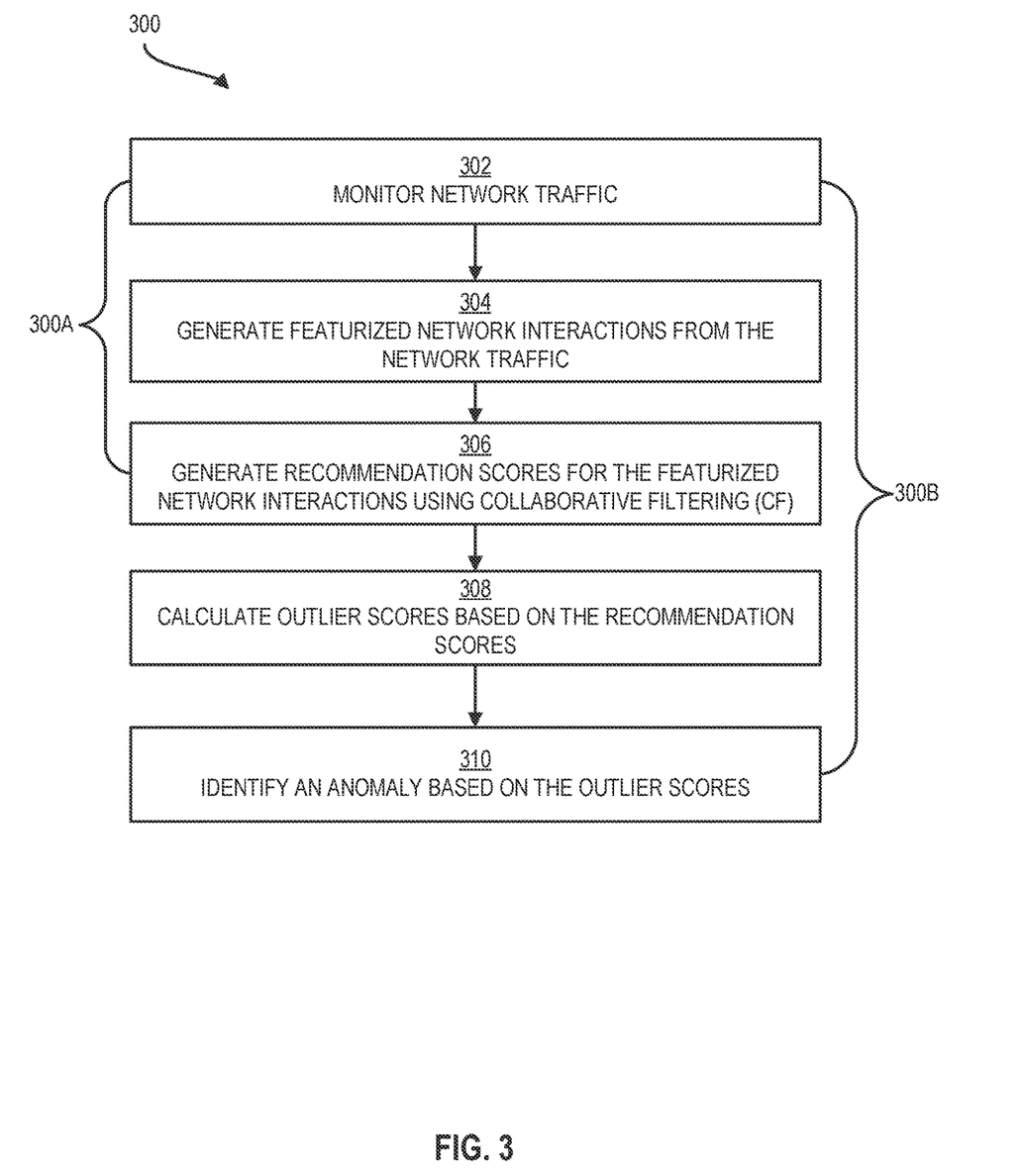
FIG. 3 illustrates a flowchart of an example method for detecting anomalies in network traffic using CF, in accordance with embodiments of the present disclosure.

FIG. 3 illustrates a flowchart of an example method 300 for detecting anomalies in network traffic using CF, in accordance with embodiments of the present disclosure. In some embodiments, the method 300 can be implemented by a server (e.g., server 102 of FIG. 1), a computer (e.g., computer 501 of FIG. 5), a processor, and/or another configuration of hardware and/or software.

Operation 302 includes monitoring network traffic for anomalies. In some embodiments, operation 302 utilizes a network monitor (e.g., network monitor 128 of FIG. 1) coupled to a network (e.g., network(s) 134 of FIG. 1). Traffic flows can be received through one or more devices in the network such as one or more routers or switches in the network.

Operation 304 includes generating featurized network interactions from the network traffic (e.g., featurized network traffic 108 of FIG. 1). In some embodiments, operation 304 receives network traffic flows as input (e.g., formatted according to any suitable format such as NetFlow® or IPFIX), processes the received network traffic flows, and generates an output in the format of <user, item, metric> where the user can represent the communication sources (source IP address, source MAC address, source host name, username, dynamic IP range, network name, container ID, etc.), and items can represent a combination of communication destination and application (application ID, destination port, etc.). Furthermore, the metric can be consistent with metric 114 of FIG. 1 and represent some quality of service metric related to size/volume, frequency, and/or recency of various network interactions.

Operation 306 includes generating recommendation scores of the featurized network interactions using collaborative filtering (CF). In some embodiments, operation 306 receives a list of tuples in the format of <user, item, metric> as input (e.g., as generated in operation 304), inputs each tuple to a CF model (e.g., CF model 116 of FIG. 1), enriches each tuple in the input with recommendation scores, and outputs a corresponding list of tuples with recommendation scores in the format of <user, item, metric, recommendation score>.

The recommendation score is the output of the CF model for a given network interaction. The recommendation score can assist in reducing false positives. For example, a given link between user (and item I can be new in the network (unseen before) and therefore would appear anomalous using traditional network anomaly detection techniques. However, if the CF model highly recommended such a link based on other users similar to user U which interacted with item I, aspects of the present disclosure can generate a relatively higher recommendation score (indicating relatively less anomalous behavior) for the link between user U and item I.

In some embodiments, operation 306 can apply different types of CF (user-based, item-based). In addition, operation 306 can use different CF techniques for different network contexts. For example, context can be based on time (e.g., working days, weekend, day hours, night hours, etc.).

Operation 308 includes calculating an outlier score for each tuple in the list of tuples generated by operation 306. Operation 308 can receive the list of tuples in the format of <user, item, metric, recommendation score>. Operation 308 can output a list of tuples in the format of <user, item, outlier score>. The outlier score for each link can be calculated based on the link's recommendation score provided by the CF model and, in some embodiments, it can also be based on the distance/ratio/gap between the link's metric and recommendation (e.g., as previously discussed in Equation 2).

Operation 310 includes detecting one or more anomalies based on the outlier scores generated in operation 308. Operation 310 can receive a list of links in the format <user, item, outlier score> (e.g., as generated in operation 308). The outlier scores of links can be used in a variety of ways. For example, a link with a high outlier score can be pushed to threat detection and investigation analytics tools and/or it can be displayed to a security analyst as an alert (e.g., notification 124 of FIG. 1). In addition, rule-based engines can leverage the outlier scores to automatically perform various mitigation actions when a link with high anomaly score is presented (e.g., automated mitigation action 126 of FIG. 1).

The method 300 can include a training phase 300A and a production phase 300B. In the training phase 300A, operations 302, 304, and 306 can be performed to collect training data, featurize the training data, and train the CF model using the featurized training data. In the production phase 300B, operations 302-310 can be performed to receive network traffic, featurize it, input it to a trained CF model, calculate outlier scores based on an output of the trained CF model, and identify an anomaly based on the outlier scores.

Figure 4:
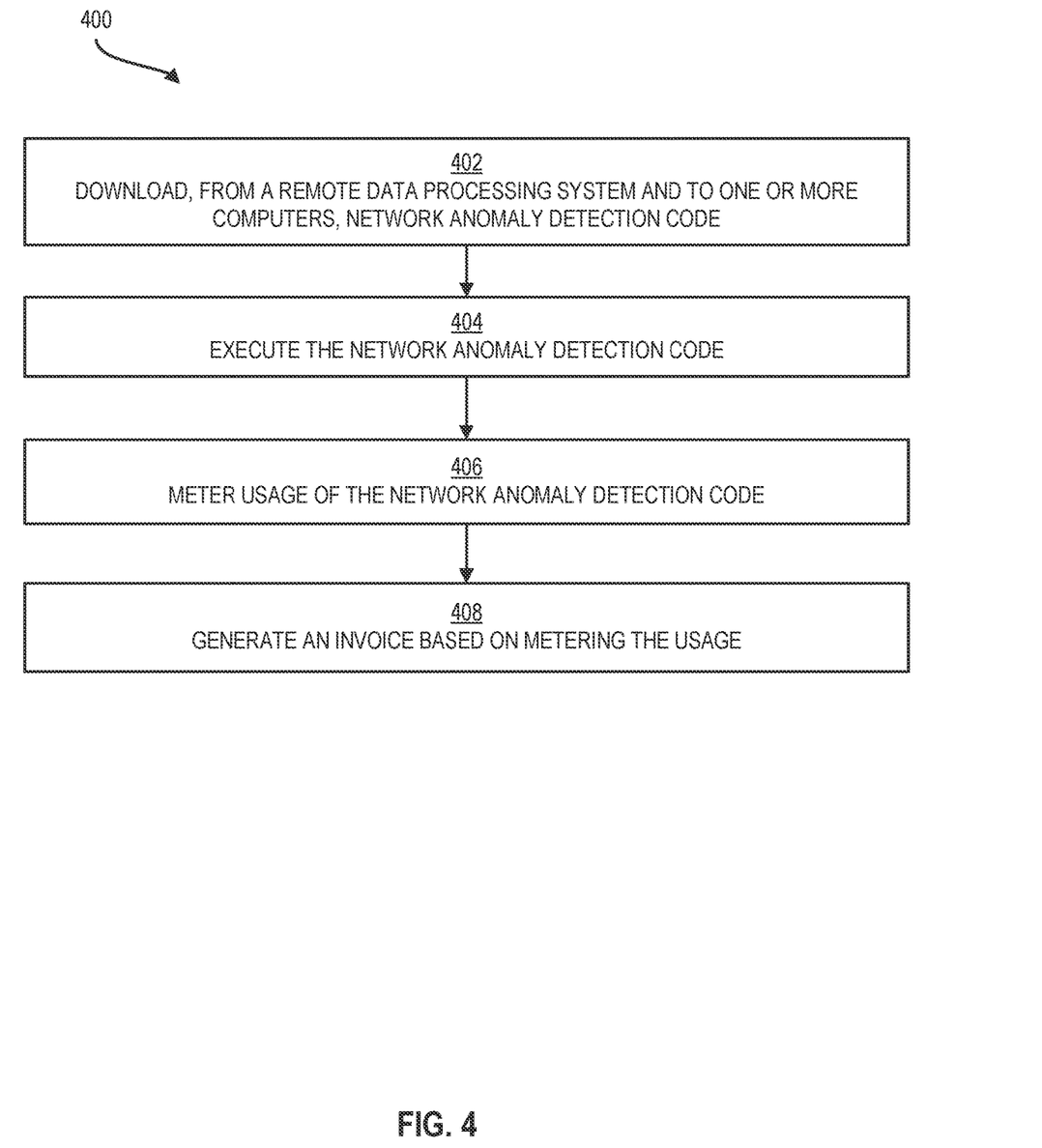
FIG. 4 illustrates a flowchart of an example method for downloading, deploying, metering, and billing usage of network anomaly detection code, in accordance with some embodiments of the present disclosure.

FIG. 4 illustrates a flowchart of an example method 400 for downloading, deploying, metering, and billing usage of network anomaly detection code, in accordance with some embodiments of the present disclosure. The method 400 can be implemented by, for example, a server (e.g., server 102 of FIG. 1), a computer (e.g., computer 501 of FIG. 5), a processor, and/or another configuration of hardware and/or software. In some embodiments, the method 400 occurs concurrently with one or more operations of the method 300 of FIG. 3.

Figure 5:
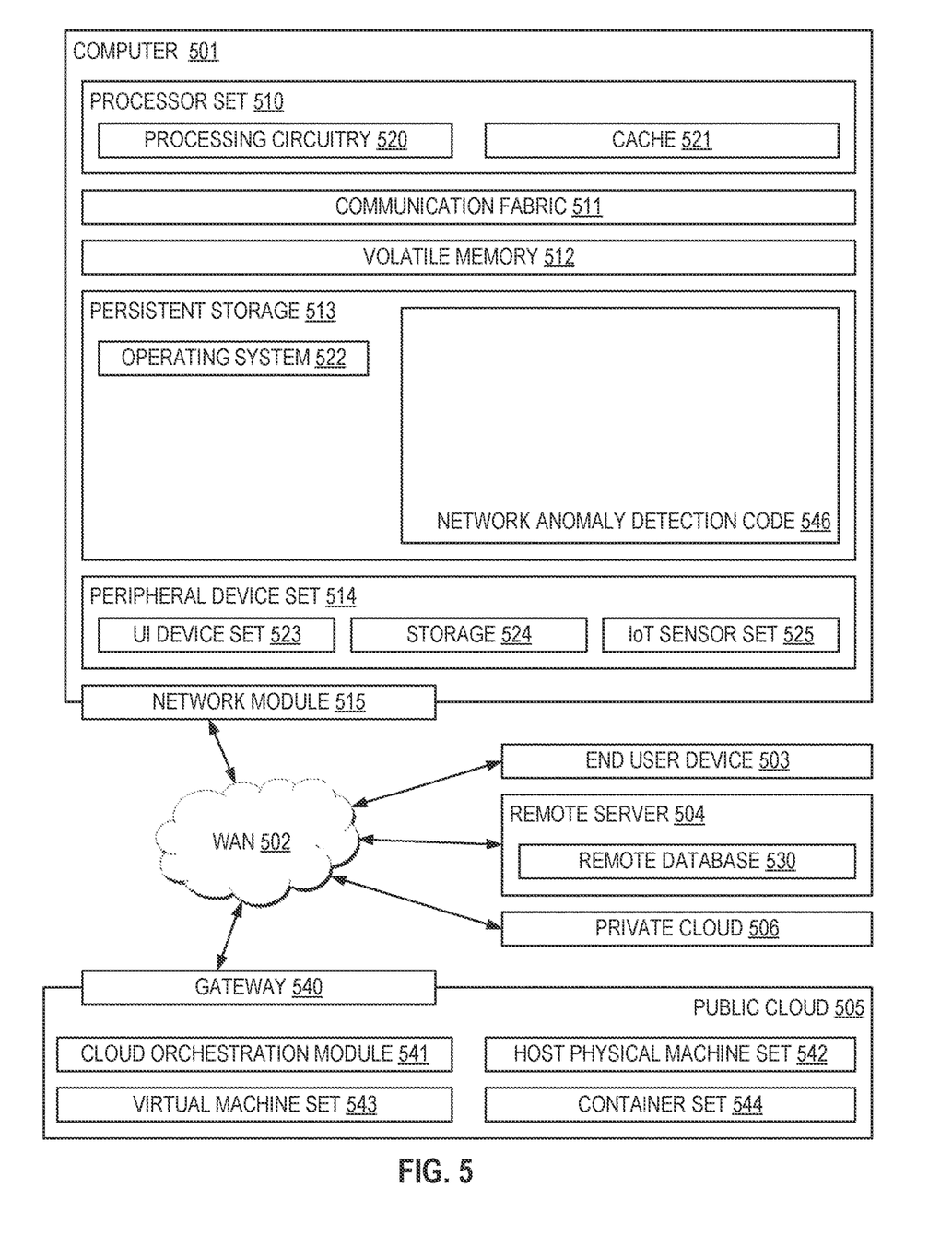
FIG. 5 illustrates a block diagram of an example computing environment, in accordance with some embodiments of the present disclosure.

Operation 402 includes downloading, from a remote data processing system and to one or more computers (e.g., server 102) network anomaly detection code (e.g., network anomaly detection code 104 of FIG. 1, network anomaly detection code 546 of FIG. 5). Operation 404 includes executing the network anomaly detection code. Operation 404 can include performing any of the methods and/or functionalities discussed herein. Operation 406 includes metering usage of the network anomaly detection code. Usage can be metered by, for example, an amount of time the network anomaly detection code is used, a number of servers and/or devices deploying the network anomaly detection code, an amount of resources consumed by implementing the network anomaly detection code, an amount of network traffic evaluated by implementing the network anomaly detection code, and/or other usage metering metrics. Operation 408 includes generating an invoice based on metering the usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 illustrates a block diagram of an example computing environment, in accordance with some embodiments of the present disclosure. Computing environment 500 contains an example of an environment for the execution of at least some of the computer code involved in performing the inventive methods, such as network anomaly detection code 546. In addition to network anomaly detection code 546, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and network anomaly detection code 546, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in network anomaly detection code 546 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in network anomaly detection code 546 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC)

connections, connections made by cables (such as universal serial bus (USB) type cables), insertion type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network.

A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding of the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes generating, from network traffic, a plurality of network interactions, wherein respective network interactions comprise a communication source and a communication destination; generating, for the respective network interactions, a recommendation score using a trained Collaborative Filtering (CF) model; calculating, for the respective network interactions, an outlier score based on the recommendation score; and generating a notification identifying an anomaly in the network traffic based on at least one outlier score satisfying a threshold.

Example 2 includes the features of Example 1, including or excluding optional features. In this example, the respective network interactions further comprise a metric associated with the communication source and the communication destination, and wherein the outlier score is further based on the metric. Optionally, the outlier score comprises a normalized difference between the recommendation score and the metric. Optionally, the metric comprises one or more selected from a group consisting of: an amount of data exchanged between the communication source and the communication destination, a recency of data exchanged between the communication source and the communication destination, and a frequency of interaction between the communication source and the communication destination.

Example 3 includes the features of any one of Examples 1 to 2, including or excluding optional features. In this example, a relatively stronger recommendation score generates a relatively less anomalous outlier score, and wherein a relatively weaker recommendation score generates a relatively more anomalous outlier score.

Example 4 includes the features of any one of Examples 1 to 3, including or excluding optional features. In this example, the communication source comprises one or more selected from a group consisting of: a source Internet Protocol (IP) address, a source Media Access Control (MAC) address, a source host name, a username, a dynamic Internet Protocol (IP) range, a network name, and a container identifier.

Example 5 includes the features of any one of Examples 1 to 4, including or excluding optional features. In this example, the communication destination comprises one or more selected from a group consisting of: an application identifier, and a destination port.

Example 6 includes the features of any one of Examples 1 to 5, including or excluding optional features. In this example, the method further comprises automatically performing a cybersecurity mitigation action on one or more network components based on the anomaly.

Example 7 includes the features of any one of Examples 1 to 6, including or excluding optional features. In this example, the method is performed by a server implementing network anomaly detection code. Optionally, the method further comprises: metering usage of the network anomaly detection code; and generating an invoice based on metering the usage of the network anomaly detection code.

Example 8 is a system. The system includes one or more computer readable storage media storing program instructions; and one or more processors which, in response to executing the program instructions, are configured to perform a method according to any one of Examples 1 to 7, including or excluding optional features.

Example 9 is a computer program product. The computer program product includes one or more computer readable storage media, and program instructions collectively stored on the one or more computer readable storage media, the program instructions comprising instructions configured to cause one or more processors to perform a method according to any one of Examples 1 to 7, including or excluding optional features.

What is claimed is:

1. A method comprising:
   generating, from network traffic, a plurality of network interactions, wherein respective network interactions comprise a communication source, a communication destination, and a metric associated with the communication source and the communication destination;
   generating, for the respective network interactions, a recommendation score using a trained Collaborative Filtering (CF) model;
   calculating, for the respective network interactions, an outlier score, wherein the outlier score comprises a normalized difference that is determined by taking an absolute value of a difference between the recommendation score and the metric and dividing by a maximal rating;
   generating a notification identifying an anomaly in the network traffic based on at least one outlier score satisfying a threshold; and
   automatically performing a cybersecurity mitigation action on one or more network components based on the anomaly.

2. The method of claim 1, wherein the metric comprises an amount of data exchanged between the communication source and the communication destination.

3. The method of claim 1, wherein the metric comprises a recency of data exchanged between the communication source and the communication destination.

4. The method of claim 1, wherein the metric comprises a frequency of interaction between the communication source and the communication destination.

5. The method of claim 1, wherein a relatively stronger recommendation score generates a relatively less anomalous outlier score, and wherein a relatively weaker recommendation score generates a relatively more anomalous outlier score.

6. The method of claim 1, wherein the communication source comprises an Internet Protocol (IP) address.

7. The method of claim 1, wherein the communication source comprises a Media Access Control (MAC) address.

8. The method of claim 1, wherein the communication source comprises a host name.

9. The method of claim 1, wherein the communication source comprises a username.

10. The method of claim 1, wherein the communication source comprises a dynamic Internet Protocol (IP) range.

11. The method of claim 1, wherein the communication source comprises a network name.

12. The method of claim 1, wherein the communication source comprises a container identifier.

13. The method of claim 1, wherein the communication source comprises, for respective network interactions, at least one Internet Protocol (IP) address, at least one Media Access Control (MAC) address, at least one host name, at least one username, at least one dynamic Internet Protocol (IP) range, at least one network name, and at least one container identifier.

14. The method of claim 1, wherein the communication destination is an application identifier.

15. The method of claim 1, wherein the method is performed by a server implementing network anomaly detection code, and wherein the method further comprises:

metering usage of the network anomaly detection code; and generating an invoice based on metering the usage of the network anomaly detection code.

16. The method of claim 1, wherein the communication destination is a destination port.

17. The method of claim 1, wherein the cybersecurity mitigation action comprises adjusting a bandwidth Quality of Service characteristic of the one or more network components.

18. A system comprising:
one or more computer readable storage media storing program instructions; and
one or more processors which, in response to executing the program instructions, are configured to perform a method comprising:
generating, from network traffic, a plurality of network interactions, wherein respective network interactions comprise a communication source, a communication destination, and a metric associated with the communication source and the communication destination;
generating, for the respective network interactions, a recommendation score using a trained Collaborative Filtering (CF) model;
calculating, for the respective network interactions, an outlier score, wherein the outlier score comprises a normalized difference that is determined by taking an absolute value of a difference between the recommendation score and the metric and dividing by a maximal rating;
generating a notification identifying an anomaly in the network traffic based on at least one outlier score satisfying a threshold; and
automatically performing a cybersecurity mitigation action on one or more network components based on the anomaly.

19. A computer program product comprising one or more computer readable storage media, and program instructions collectively stored on the one or more computer readable storage media, the program instructions comprising instructions configured to cause one or more processors to perform a method comprising:
generating, from network traffic, a plurality of network interactions, wherein respective network interactions comprise a communication source, a communication destination, and a metric associated with the communication source and the communication destination;
generating, for the respective network interactions, a recommendation score using a trained Collaborative Filtering (CF) model;
calculating, for the respective network interactions, an outlier score, wherein the outlier score comprises a normalized difference that is determined by taking an absolute value of a difference between the recommendation score and the metric and dividing by a maximal rating;
generating a notification identifying an anomaly in the network traffic based on at least one outlier score satisfying a threshold; and
automatically performing a cybersecurity mitigation action on one or more network components based on the anomaly.

* * * * *